(12) United States Patent
Hayasaka (10) Patent No.: US 9,518,232 B2
(45) Date of Patent: *Dec. 13, 2016

(54) HYDROISOMERIZATION CATALYST, PROCESS FOR PRODUCING THE SAME, METHOD OF DEWAXING HYDROCARBON OIL, AND PROCESS FOR PRODUCING LUBE BASE OIL

(75) Inventor: Kazuaki Hayasaka, Yokohama (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 1416 days.

This patent is subject to a terminal disclaimer.

(21) Appl. No.: 12/865,921

(22) PCT Filed: Feb. 4, 2009

(86) PCT No.: PCT/JP2009/051906
§ 371 (c)(1),
(2), (4) Date: Nov. 3, 2010

(87) PCT Pub. No.: WO2009/099111
PCT Pub. Date: Aug. 13, 2009

(65) Prior Publication Data
US 2011/0042267 A1    Feb. 24, 2011

(30) Foreign Application Priority Data
Feb. 8, 2008   (JP) ............... P2008-029282

(51) Int. Cl.
| | | |
|---|---|---|
| *B01J 29/06* | (2006.01) | |
| *C10G 25/03* | (2006.01) | |
| *C10G 45/64* | (2006.01) | |
| *B01J 29/064* | (2006.01) | |
| *B01J 29/076* | (2006.01) | |
| *B01J 29/72* | (2006.01) | |
| *C01B 39/48* | (2006.01) | |
| *B01J 29/068* | (2006.01) | |
| *B01J 37/00* | (2006.01) | |
| *B01J 29/74* | (2006.01) | |
| *B01J 29/78* | (2006.01) | |
| *B01J 35/02* | (2006.01) | |
| *B01J 35/10* | (2006.01) | |

(52) U.S. Cl.
CPC ............. *C10G 45/64* (2013.01); *B01J 29/064* (2013.01); *B01J 29/068* (2013.01); *B01J 29/076* (2013.01); *B01J 29/7284* (2013.01); *B01J 29/7484* (2013.01); *B01J 29/7884* (2013.01); *B01J 35/026* (2013.01); *B01J 37/0009* (2013.01); *C01B 39/48* (2013.01); *B01J 29/7461* (2013.01); *B01J 29/7492* (2013.01); *B01J 29/7861* (2013.01); *B01J 29/7892* (2013.01); *B01J 35/023* (2013.01); *B01J 35/1014* (2013.01); *B01J 35/1019* (2013.01); *B01J 35/1038* (2013.01); *B01J 2229/186* (2013.01); *B01J 2229/20* (2013.01); *B01J 2229/40* (2013.01); *B01J 2229/42* (2013.01); *C10G 2300/1022* (2013.01); *C10G 2300/1085* (2013.01); *C10G 2400/10* (2013.01)

(58) Field of Classification Search
USPC ............... 502/60, 62, 66, 74, 77; 208/27, 28
See application file for complete search history.

(56) References Cited

U.S. PATENT DOCUMENTS

| | | | |
|---|---|---|---|
| 4,312,790 A | 1/1982 | Butter et al. | |
| 4,385,195 A | 5/1983 | Butter et al. | |
| 4,694,114 A | 9/1987 | Chu et al. | |
| 5,143,879 A * | 9/1992 | Whitehurst | B01J 29/82 423/702 |
| 5,282,958 A | 2/1994 | Santilli et al. | |
| 5,336,478 A | 8/1994 | Dwyer et al. | |
| 6,548,040 B1 | 4/2003 | Rouleau et al. | |
| 7,261,806 B2 | 8/2007 | Benard et al. | |

(Continued)

FOREIGN PATENT DOCUMENTS

| | | |
|---|---|---|
| CN | 86106388 | 4/1988 |
| EP | 0 142 351 | 7/1992 |

(Continued)

OTHER PUBLICATIONS

S. Ernst, Synthesis and Shape-Selective Properties of ZSM-22 (Abstract), 48 Appl. Catal. 137-148 (1989).*
G. Wang et al., Hydroisomerization Activity and Selectivity of n-Dodecane over Modified Pt/ZSM-22 Catalysts, 335 Appl. Catal. A: Gen. 20-27 (2008).*
Zhang, S. et al, "Synthesis, characterization and hydroisomerization catalytic performance of nanosize SAPO-11 molecular sieves", Catalysis Letters, Springer, vol. 118, No. 1-2, DOI: 10.1007/s10562-007-9138-1, Oct. 1, 2007, p. 109-p. 117.

(Continued)

*Primary Examiner* — Elizabeth Wood
(74) *Attorney, Agent, or Firm* — Greenblum & Bernstein, P.L.C.

(57) ABSTRACT

A hydroisomerization catalyst of the present invention is obtained by calcining a catalyst composition containing an ion-exchanged molecular sieve or a calcined product thereof, and at least one metal selected from the group consisting of metals of Groups 8 to 10 in Periodic Table of the elements, molybdenum and tungsten, carried on the ion-exchanged molecular sieve or the calcined product thereof, wherein the ion-exchanged molecular sieve is obtained by ion-exchanging a molecular sieve, which includes nanocrystals having a pore structure of ten-membered rings or eight-membered rings and having a ratio of the pore volume to the external surface area ([pore volume]/[external surface area]) of $2.0 \times 10^{-4}$ mL/m$^2$ to $8.0 \times 10^{-4}$ mL/m$^2$ and contains an organic template, in a solution containing a cationic species.

12 Claims, 2 Drawing Sheets

(56) References Cited

U.S. PATENT DOCUMENTS

| | | | |
|---|---|---|---|
| 8,758,596 B2 * | 6/2014 | Hayasaka | B01J 29/7261 208/133 |
| 2003/0017937 A1 | 1/2003 | Ihm et al. | |
| 2004/0065583 A1 | 4/2004 | Jiang | |
| 2004/0065586 A1 | 4/2004 | Jiang | |
| 2004/0067856 A1 | 4/2004 | Johnson et al. | |
| 2004/0144691 A1 | 7/2004 | Benard et al. | |
| 2008/0045614 A1 | 2/2008 | Benard et al. | |

FOREIGN PATENT DOCUMENTS

| | | |
|---|---|---|
| EP | 1 380 631 | 1/2004 |
| JP | 1-308237 | 12/1989 |
| JP | 5-508876 | 12/1993 |
| JP | 2001-146418 | 5/2001 |
| JP | 2003-033658 | 2/2003 |
| JP | 2003-505576 | 2/2003 |
| JP | 2005-296698 | 10/2005 |
| JP | 2006-502304 | 1/2006 |
| JP | 2008-501838 | 1/2008 |
| RU | 2181750 | 4/2002 |
| RU | 2228947 | 5/2004 |
| RU | 2280064 | 7/2006 |
| WO | WO 92/01657 | 2/1992 |
| WO | 01/07538 | 2/2001 |
| WO | 2004/033593 | 4/2004 |
| WO | 2005/121280 | 12/2005 |

OTHER PUBLICATIONS

Aguado, J. et al, "Low temperature synthesis and properties of ZSM-5 aggregates formed by ultra-small nanocrystals, Microporous and Mesoporous Materials, vol. 75, No. 1-2, DOI: 10.1016/j.micromeso.2004.06.027", Aug. 28, 2004, p. 41-p. 49.

Kazuaki Hayasaka et al., "Formation of ZSM-22 Elementary Nanorods", European Journal Chemistry-A vol. 13, Issue 36, Sep. 2007, pp. 10070-10077.

J. A. Martens et al., "J. Catal., 2006", , , pp. 451-459.

Kenneth Villani et al., "Platinum Particle Size and Suport Effects in NOX Mediated Carbon Oxidation Over Platinum Catlysts", Environ. Sci. Technol., vol. 40, XP002648528, Mar. 22, 2006, pp. 2727-2733.

Search report from E.P.O. that issued with respect to patent family member European Patent Application No. 09708516.1, mail date is Jul. 20, 2011.

International Preliminary Report on Patentability issued with respect to PCT/JP2009/051906 on Sep. 7, 2010.

* cited by examiner

HYDROISOMERIZATION CATALYST, PROCESS FOR PRODUCING THE SAME, METHOD OF DEWAXING HYDROCARBON OIL, AND PROCESS FOR PRODUCING LUBE BASE OIL

TECHNICAL FIELD

The present invention relates to a novel hydroisomerization catalyst and a method for manufacturing the catalyst, and a method for dewaxing a hydrocarbon oil and a method for manufacturing a lube-oil base oil using the hydroisomerization catalyst.

BACKGROUND ART

Among petroleum products, for example, lube-oils, gas oils and jet fuels are products whose cold flow property is given importance to. Therefore, base oils used in these products are desirably ones from which wax components such as normal paraffins and slightly branched isoparaffins causing reduction of cold flow property are completely or partially removed, or in which the wax components are converted to components other than the wax components. Hydrocarbons obtained by Fischer-Tropsch synthesis method are recently paid attention as feedstock oils when lube-oils and fuels are manufactured in view of containing no environmental load substances such as sulfur compounds, but the hydrocarbons also contain many wax components.

As a dewaxing technology to remove wax components from hydrocarbon oils, for example, a method of extracting wax components with a solvent such as liquefied propane or MEK is known. However, this method has such problems that the operational cost is high, the applicable kind of feedstock oil is limited, and further, the product yield is limited by the kind of feedstock oil.

On the other hand, as a dewaxing technology to convert wax components in hydrocarbon oils to non-wax components, for example, catalytic dewaxing is known by which the hydrocarbon oil is brought into contact with a so-called bifunctional catalyst having a hydrogenation-dehydrogenation capability and an isomerization capability to isomerize normal paraffins in the hydrocarbon to isoparaffins. As bifunctional catalysts used for catalytic dewaxing, solid acids, particularly catalysts containing a molecular sieve composed of zeolite or the like and a metal of Group 8 to 10, or 6 of Periodic Table of the elements, especially catalysts in which the molecular sieve carries the metal, are known.

The catalytic dewaxing is effective as a method of improving the cold flow property of hydrocarbon oils, but to obtain fractions suitable for lube-oil base oils and fuel base oils, the conversion of normal paraffins must be sufficiently high. However, since the catalysts used in the catalytic dewaxing have an isomerization capability and also a cracking capability of hydrocarbons, in the case where hydrocarbon oils are catalytically dewaxed, a rise in the conversion of the normal paraffins involves progress of turning the hydrocarbon oils into light oils, bringing about a difficulty of obtaining desired fractions with a high yield. Especially in the case where base oils for high-quality lube-oils required to have a high viscosity index and a low pour point are manufactured, it is very difficult to economically obtain target fractions by catalytic dewaxing of hydrocarbon oils, and therefore, synthetic base oils such as poly-α-olefins are often used in such a field.

From the above situations, in the field of manufacturing lube-oil base oils and fuel base oils, a catalytic dewaxing technology to obtain desired isoparaffin fractions from hydrocarbon oils containing wax components with a high yield is demanded.

Attempts have been made so far to improve the isomerization selectivity of catalysts used in the catalytic dewaxing. For example, Patent Document 1 described below discloses a process to manufacture a dewaxed lube-oil by bringing a raw material of a straight-chain or slightly branched hydrocarbon having 10 or more carbon atoms into contact with a catalyst composed of a molecular sieve which has medium-sized one-dimensional pores such as ZSM-22, ZSM-23 and ZSM-48 containing a metal of Group VIII or the like in Periodic Table and whose crystallites have a size not exceeding about 0.5 μm, under an isomerization condition.

A molecular sieve constituting a catalyst for catalytic dewaxing is usually manufactured by hydrothermal synthesis in the presence of an organic template containing an amino group, an ammonium group or the like to establish a predetermined pore structure. Then, the synthesized molecular sieve is calcined at a temperature of, for example, about 550° C. or higher in an atmosphere containing molecular oxygen to remove the contained organic template, for example, as described in the final paragraph in section "2.1. Materials" on page 453 of Non-Patent Document 1 shown below. Next, the calcined molecular sieve is typically ion-exchanged into an ammonium type in an aqueous solution containing ammonium ions, for example, as described in section "2.3. Catalytic experiments" on page 453 of Non-Patent Document 1. On the molecular sieve after the ion-exchange, a metal component of Groups 8 to 10 or the like in Periodic Table of the elements is further carried. Then, the molecular sieve on which the metal component is carried is dried, and filled in a reactor, optionally through a process such as molding, and calcined typically at a temperature of about 400° C. in an atmosphere containing molecular oxygen, and further subjected to a reduction treatment using hydrogen or the like at about the same temperature to impart a catalytic activity as a bifunctional catalyst.

[Patent Document 1] U.S. Pat. No. 5,282,958
[Non-Patent Document 1] J. A. Martens, et. al., J. Catal., 2006, 239, 451

DISCLOSURE OF THE INVENTION

Even by the manufacturing method described above in Patent Document 1, since the isomerization selectivity of a catalyst cannot be said to be sufficient and the cracking activity is not sufficiently suppressed, it is difficult to obtain, with a high yield, isoparaffin fractions suitable for desired lube-oil base oils and fuel base oils from hydrocarbon oils containing normal paraffin components. Especially in manufacture of base oils of high-performance lube-oils, there is a need for raising the conversion of normal paraffins to a degree that the base oils contain substantially no normal paraffins. In this case, the cracking of normal paraffins and/or isoparaffins being isomerized products become active, and target isoparaffin fractions cannot be obtained with an economical yield.

The present invention is achieved in consideration of the situations described above, and has objects to provide a hydroisomerization catalyst having a sufficiently low cracking activity of normal paraffins and/or produced isoparaffins when the normal paraffin conversion is sufficiently raised, and having a high isomerization selectivity, in hydroisomerization of hydrocarbon oils containing normal paraffins, a method for manufacturing the hydroisomerization catalyst, and a method for dewaxing a hydrocarbon oil and a method for manufacturing a lube-oil base oil using the hydroisomerization catalyst.

As a result of exhaustive studies to solve the above problems, the present inventors have found that a catalyst manufactured by subjecting a specified molecular sieve comprising a microcrystal having a specified crystal morphology to an ion-exchange treatment in the state containing an organic template to obtain an ion-exchanged molecular sieve, and by making the obtained ion-exchanged molecular sieve carry a specified metal exhibits a low cracking activity in a high conversion region of a normal paraffin (normal decane) in the hydroisomerization reaction of the normal paraffin, and can raise the yield of target isoparaffin fractions more than the case where conventional catalysts are used, that is, the catalyst simultaneously satisfies both a high isomerization activity and a low cracking activity in high levels, and has a high isomerization selectivity. This has led to the completion of the present invention.

The present inventors have studied microcrystals having the specified crystal morphology described above from beforehand, and reported that in Document "K. Hayasaka, et. al., Chemistry-A, European Journal, 2007, 13, 10070-10077", a hydroisomerization catalyst in which nanocrystals (nanorods) of ZSM-22 carry platinum has a lower activity than a hydroisomerization catalyst in which ZSM-22 having usually-sized crystals carry platinum. However, subjecting such nanocrystals to a specified ion-exchange treatment described above improves the isomerization selectivity in a high conversion region, which was an unexpected result.

The hydroisomerization catalyst of the present invention is characterized that the hydroisomerization catalyst is obtained by calcining a catalyst composition comprising an ion-exchanged molecular sieve or a calcined product thereof, and at least one metal selected from the group consisting of metals of Groups 8 to 10 in Periodic Table of the elements, molybdenum and tungsten, carried on the ion-exchanged molecular sieve or the calcined product thereof, wherein the ion-exchanged molecular sieve is obtained by ion-exchanging a molecular sieve, which comprises a nanocrystal having a pore structure of ten-membered rings or eight-membered rings and having a ratio of the pore volume to the external surface area ([pore volume]/[external surface area]) of $2.0 \times 10^{-4}$ mL/m$^2$ to $8.0 \times 10^{-4}$ mL/m$^2$ and comprises an organic template, in a solution containing a cationic species.

Periodic Table of the elements used here indicates the long form thereof prescribed by International Union of Pure and Applied Chemistry (IUPAC).

The hydroisomerization catalyst of the present invention, in the hydroisomerization of a hydrocarbon oil containing normal paraffins, can sufficiently suppress the cracking of normal paraffins and/or produced isoparaffins when the normal paraffin conversion is sufficiently raised, and can develop a high isomerization selectivity. Use of the hydroisomerization catalyst of the present invention for the hydroisomerization of a hydrocarbon oil containing normal paraffin components enables to obtain isoparaffin fractions suitable for desired lube-oil base oils and fuel base oils with a high yield. Further, the hydroisomerization catalyst of the present invention is useful especially for manufacture of base oils of high-performance lube-oils.

In the hydroisomerization catalyst of the present invention, the molecular sieve comprising an organic template is preferably ZSM-22 type-, ZSM-23 type-, or ZSM-48 type zeolite in view of the isomerization activity and selectivity.

Further, the ion-exchanged molecular sieve is preferably one obtained by ion-exchanging the molecular sieve comprising an organic template in the presence of ammonium ions or protons in view of the isomerization activity of the catalyst.

Further, the ion-exchanged molecular sieve is preferably one obtained by ion-exchanging the molecular sieve comprising an organic template in a solution containing water as a main solvent and a cationic species in view of the efficiency of ion-exchange, and the like.

Further, the ion-exchanged molecular sieve is preferably one obtained by ion-exchanging the molecular sieve comprising an organic template by replacing the above-mentioned solution with a new one once or more in view of the efficiency of ion-exchange, and the like.

Further, in the hydroisomerization catalyst of the present invention, the catalyst composition preferably comprises platinum and/or palladium carried on the ion-exchanged molecular sieve or a calcined product thereof in view of the isomerization activity.

Further, the hydroisomerization catalyst of the present invention is preferably one obtained by calcining the catalyst composition in an atmosphere containing molecular oxygen, and thereafter, reducing the calcined composition in an atmosphere containing molecular hydrogen.

Further, in the hydroisomerization catalyst of the present invention, the catalyst composition comprises 1 part by mass to 90 parts by mass of the ion-exchanged molecular sieve or the calcined product thereof and 99 parts by mass to 10 parts by mass of at least one porous oxide selected from the group consisting of alumina, silica, titania, boria, magnesia and zirconia, in view that the desired isomerization capability, and moldability and mechanical strengths of the catalyst composition can easily be obtained.

Further, in the hydroisomerization catalyst of the present invention, the catalyst composition preferably comprises a carrier obtained by calcining a carrier composition comprising 1 part by mass to 90 parts by mass of the ion-exchanged molecular sieve and 99 parts by mass to 10 parts by mass of at least one porous oxide selected from the group consisting of alumina, silica, titania, boria, magnesia and zirconia, and the above-mentioned metal carried on the carrier, in view of the desired isomerization capability, and moldability and mechanical strengths of the catalyst composition.

The present invention further provides a method for manufacturing a hydroisomerization catalyst, the method comprising: a step a of hydrothermally synthesizing a molecular sieve comprising a nanocrystal having a pore structure of ten-membered rings or eight-membered rings and having a ratio of the pore volume to the external surface area ([pore volume]/[external surface area]) of $2.0 \times 10^{-4}$ mL/m$^2$ to $8.0 \times 10^{-4}$ mL/m$^2$ and comprising an organic template; a step b of ion-exchanging the molecular sieve comprising an organic template in a solution containing a cationic species to obtain an ion-exchanged molecular sieve; a step c of making the ion-exchanged molecular sieve or the calcined product thereof carry at least one metal selected from the group consisting of metals of Groups 8 to 10 in Periodic Table of the elements, molybdenum and tungsten to obtain a catalyst composition; and a step d of calcining the catalyst composition.

Since the method for manufacturing the hydroisomerization catalyst of the present invention comprises the above-mentioned steps, in the hydroisomerization of a hydrocarbon oil containing normal paraffins, the method can provide a hydroisomerization catalyst which is sufficiently low in the cracking activity of normal paraffins and/or produced isoparaffins when the normal paraffin conversion is sufficiently raised, and has a high isomerization selectivity.

In the method for manufacturing the hydroisomerization catalyst of the present invention, in the above-mentioned step c, a carrier is preferably made to carry at least one metal selected from the group consisting of metals of Groups 8 to 10 in Periodic Table of the elements, molybdenum and tungsten to obtain the above-mentioned catalyst composition, wherein the carrier is obtained by calcining a carrier composition comprising 1 part by mass to 90 parts by mass of the ion-exchanged molecular sieve and 99 parts by mass to 10 parts by mass of at least one porous oxide selected from the group consisting of alumina, silica, titania, boria, magnesia and zirconia.

The present invention also provides a method for dewaxing a hydrocarbon oil, the method comprising bringing the hydrocarbon oil containing normal paraffins having 10 or more carbon atoms into contact with the above-mentioned hydroisomerization catalyst of the present invention in the presence of hydrogen to convert a part of or the whole of the normal paraffins into isoparaffins.

The above-mentioned hydrocarbon oil is preferably at least one selected from the group consisting of slack wax, deoiled wax, paraffin wax, microcrystalline wax, petrolatum, and wax from Fischer-Tropsch synthesis.

The present invention further provides a method for manufacturing a lube-oil base oil, the method comprising a step of bringing a hydrocarbon oil containing normal paraffins having 10 or more carbon atoms into contact with the above-mentioned hydroisomerization catalyst of the present invention in the presence of hydrogen under the condition of a conversion of the normal paraffins of substantially 100% by mass, wherein the conversion is defined by the formula (I) described below:
[Expression 1]

Conversion of normal paraffins (%)=[1−(total mass % of normal paraffins having Cn or more carbon atoms contained in a hydrocarbon oil after the contact)/(total mass % of normal paraffins having Cn or more carbon atoms contained in the hydrocarbon oil before the contact)]×100        (I)

wherein Cn denotes a minimum number of carbon atoms of normal paraffins having 10 or more carbon atoms contained in the hydrocarbon oil before the contact.

EFFECT OF THE INVENTION

The present invention can provide a hydroisomerization catalyst which is sufficiently low in the cracking activity of normal paraffins and/or produced isoparaffins when the normal paraffin conversion is sufficiently raised in hydroisomerization of hydrocarbon oils containing normal paraffins, and has a high isomerization selectivity, and can provide a method for manufacturing the hydroisomerization catalyst. Further, the present invention can provide, by using the hydroisomerization catalyst, a method for dewaxing hydrocarbon oils, the method enabling to obtain, stably and with a high yield, a hydrocarbon oil suitable for lube-oil base oils and/or fuel base oils from hydrocarbon oils containing normal paraffins, and also a method for manufacturing a lube-oil base oil, the method enabling to obtain, with a high yield, a high-performance lube-oil base oil from hydrocarbon oils containing normal paraffins.

BEST MODES FOR CARRYING OUT THE INVENTION

<Hydroisomerization catalyst>

The hydroisomerization catalyst of the present invention is one obtained by calcining a catalyst composition comprising an ion-exchanged molecular sieve or a calcined product thereof, and at least one metal selected from the group consisting of metals of Groups 8 to 10 in Periodic Table of the elements, molybdenum and tungsten, carried on the ion-exchanged molecular sieve or the calcined product thereof, wherein the ion-exchanged molecular sieve is obtained by ion-exchanging a molecular sieve, which comprises a nanocrystal having a pore structure of ten-membered rings or eight-membered rings and having a ratio of the pore volume to the external surface area ([pore volume]/[external surface area]) of $2.0 \times 10^{-4}$ mL/m2 to $8.0 \times 10^{-4}$ mL/m$^2$ and comprises an organic template, in a solution containing a cationic species.

In the hydroisomerization catalyst of the present invention, in the case where the catalyst composition comprises a calcined product of an ion-exchanged molecular sieve and the above-mentioned metal carried on the calcined product, the calcined product of the ion-exchanged molecular sieve may be contained in the catalyst composition as a carrier obtained by calcining a carrier composition containing the ion-exchanged molecular sieve, and the metal carried on the calcined product may be contained in a form carried on the carrier in the catalyst composition.

A molecular sieve containing an organic template according to the hydroisomerization catalyst of the present invention is not especially limited as long as it is hydrothermally synthesized in the presence of the organic template (hereinafter, referred to as synthesized molecular sieve), but is preferably a zeolite. The molecular sieve containing an organic template is more preferably a zeolite having a pore structure of ten-membered rings or eight-membered rings, in view of simultaneously satisfying both a high isomerization activity and a suppressed cracking activity in the isomerization reaction of normal paraffins in a high level. Such molecular sieves specifically include AEL, EUO, FER, HEU, MEL, MFI, NES, TON, MTT, WEI and ZSM-48 type zeolites, which have a pore structure of ten-membered rings, and ANA, CHA, ERI, GIS, KFI, LTA, NAT, PAU, YUG and DDR type zeolites, which have a pore structure of eight-membered rings. Here, each combination of these three alphabetical characters indicates a skeletal structure code given to each structure of classified molecular sieve type zeolites by The Structure Commission of The International Zeolite Association. Further, zeolites having the same topology are collectively designated as having the same code.

Among the above-mentioned zeolites, preferable are zeolites having TON or MTT structures having one-dimensional pore structure of ten-membered rings, and a crystalline aluminosilicate, ZSM-48 zeolite. As a zeolite having TON structure, a crystalline aluminosilicate, ZSM-22, is more preferable. As a zeolite having MTT structure, a crystalline aluminosilicate, ZSM-23, is more preferable.

In the case of using a crystalline aluminosilicate, ZSM-22, ZSM-23 or ZSM-48 described above as a synthesized molecular sieve, the molar ratio ([Si]/[Al], hereinafter, referred to as "Si/Al ratio") of silicon and aluminum elements in these crystalline aluminosilicates is preferably 10 to 400, and more preferably 20 to 300. With the Si/Al ratio of less than the lower limit, although the activity for conversion of normal paraffins rises, the selectivity of isomerization to isoparaffins decreases and there is a tendency of a sharp increase in the cracking involved in a rise of the reaction temperature, which is not preferable. By contrast, with the Si/Al ratio exceeding the upper limit, the catalyst activity necessary for the conversion of normal paraffins can hardly be obtained, which is not preferable.

An organic template used when a molecular sieve is hydrothermally synthesized is selected depending on the structure of the molecular sieve, but since the molecular sieve is synthesized usually under an alkali condition, the organic template is preferably an amine derivative in view that it can make an influence on properties of synthesis raw materials small.

Further, the organic template is more preferably at least one selected from the group consisting of alkylamines, alkyldiamines, alkyltriamines, alkyltetramines, pyrrolidine, piperazine, aminopiperazine, alkylpentamines, alkylhexamines, and derivatives thereof.

The molecular sieve constituting the hydroisomerization catalyst of the present invention has a form of a nanostructure. The nanostructure used here corresponds to "nanorod" described in the document shown before, "K. Hayasaka et al., Chemistry-A European Journal, 2007, 13, 10070-10077" (hereinafter, referred to as "Non-Patent Document 2"), and indicates a microcrystal having a size of about 25 nm or less in length in shorter axis direction (width: D).

Figure 2:
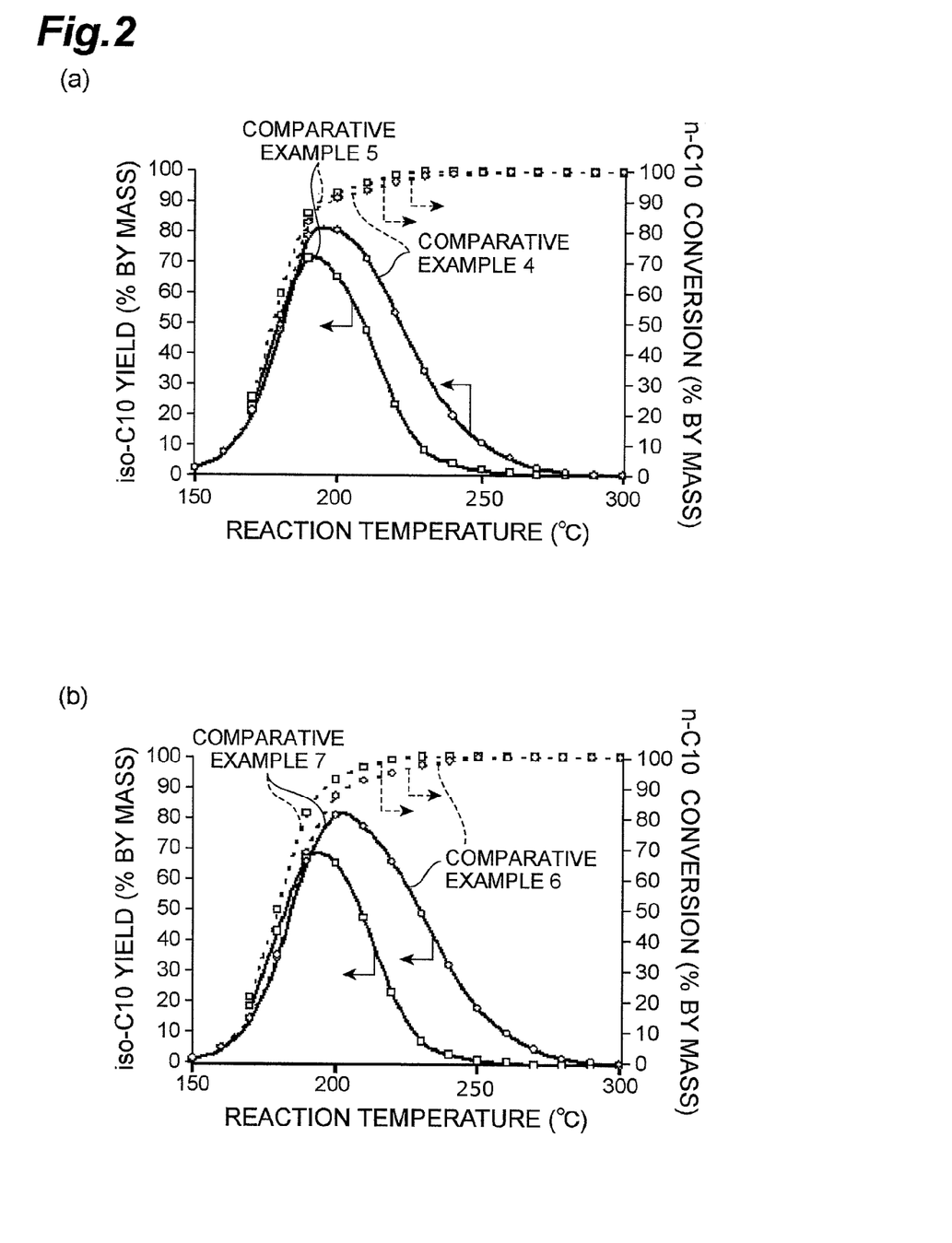
FIG. 2 is a plot diagram showing the normal decane conversion and the C10-isomer yield obtained from an isomerization reaction using normal decane vs. the reaction temperature.

A method for manufacturing a molecular sieve having a form of a nanocrystal is not especially limited, but in the synthesis of the molecular sieve by a usual hydrothermal synthesis, for example, making the synthesis time shorter than usual and finishing the synthesis at a stage before nanocrystals produced at the initial period of the synthesis are aggregated to usual crystals can provide a molecular sieve having a form of a nanocrystal. The details of this manufacturing method are described in Non-Patent Document 2 shown above. As shown in FIG. 2 of Non-Patent Document 2, nanocrystals of about 15 nm in length in shorter axis direction are produced till a certain time passes after the initiation of the hydrothermal synthesis of ZSM-22. If the hydrothermal synthesis time is over a certain time, aggregation of nanocrystals sharply occurs and aggregated crystals are produced and grow to a length of the crystals in shorter axis direction over 30 nm and up to about 35 nm. Then, for the elapse of the hydrothermal synthesis time thereafter, the length of the crystals in shorter axis direction does not largely change.

The molecular sieve having a form of a nanocrystal constituting the hydroisomerization catalyst of the present invention has a length of the crystal in shorter axis direction preferably in the range of 5 to 30 nm, and more preferably in the range of 5 to 25 nm. With the length in shorter axis direction of less than 5 nm, since the formation of crystals is insufficient and the crystals of the molecular sieve are liable to be damaged when a catalyst is calcined and activated, the activity of the catalyst is likely to decrease remarkably. With the length in shorter axis direction of less than 5 nm, it is difficult to determine the length of crystals in shorter axis direction by analytical means. On the other hand, a catalyst constituted of aggregated crystals having a length of the crystals in shorter axis direction exceeding 30 nm has such tendencies that the cracking activity of normal paraffins and/or isoparaffins in the region of a high normal paraffin conversion rises, and it is difficult to obtain target isoparaffin fractions with a sufficiently high yield.

The determination of the length of crystals in shorter axis direction used here can be carried out by the X-ray diffraction analysis (XRD), the nitrogen absorption test at $-196°$ C. and the transmission electron microscopic observation (TEM), described in "Experimental Section" of Non-Patent Document 2. The above-mentioned preferable range of the length of nanocrystals in shorter axis direction was obtained by XRD.

The molecular sieve having a form of a nanocrystal constituting the hydroisomerization catalyst of the present invention has a smaller pore volume of crystals and a larger external surface area thereof determined by the nitrogen absorption test at $-196°$ described in Non-Patent Document 2 than those of aggregated crystals, and has a ratio of the pore volume to the external surface area (a ratio of pore volume/external surface area) in the range of $2.0 \times 10^{-4}$ mL/m$^2$ to $8.0 \times 10^{-4}$ mL/m$^2$. The ratio is more preferably $2.5 \times 10^{-4}$ mL/m$^2$ to $7.0 \times 10^{-4}$ mL/m$^2$. With the ratio of pore volume/external surface area of the molecular sieve of less than the above-mentioned lower limit, since the formation of crystals is insufficient and the crystals of the molecular sieve are liable to be damaged when the catalyst is calcined and activated, the activity of the hydroisomerization catalyst constituted of such a molecular sieve is likely to decrease the activity remarkably. By contrast, with that exceeding the upper limit, in the hydroisomerization catalyst constituted of such a molecular sieve, the isomerization selectivity in a high normal paraffin conversion region is likely to decrease. Here, as the pore volume and the external surface area of a molecular sieve, values are employed which are determined by carrying out the nitrogen absorption test at $-196°$ C. for the molecular sieve in the state that an organic template has been removed by calcination and thereafter, the ion-exchange treatment has been carried out. The removal of an organic template by calcination can be carried out, for example, by heating a molecular sieve after hydrothermal synthesis at a rate of 5° C./min to 400° C. in a quartz tube furnace in a nitrogen gas flow, thereafter holding the molecular sieve in the conditions for 6 hours, then changing over the nitrogen gas flow to an oxygen gas flow, raising the temperature at 5° C./min up to 550° C., and thereafter holding the temperature at 550° C. for about 12 hours. The ion-exchange treatment thereafter can be carried out, for example, by adding 0.5N ammonium chloride aqueous solution to the calcined molecular sieve and refluxing by heating for about 12 hours. After the finish of the ion-exchange, a solid content is sampled by filtering, washed with ion-exchange water, and dried in a drier at 60° C. for about 12 hours to obtain an ion-exchanged molecular sieve from which the organic template has been removed, which ion-exchanged molecular sieve is used as a test specimen for the pore volume and the external surface area.

Meanwhile, conventional molecular sieves constituting hydroisomerization catalysts are, after hydrothermally synthesized, calcined usually in an atmosphere containing molecular oxygen at a temperature of 550° C. or higher for removing an organic template present therein. The temperature is selected for sufficiently burning and removing the organic template. Then, after the calcination, the ion-exchange, carrying of a metal component and activation by calcination are carried out to manufacture conventional catalysts. By contrast, the hydroisomerization catalyst of the present invention is manufactured by using an ion-exchanged molecular sieve obtained by subjecting a molecular sieve composed of the above-mentioned specified microcrystal and in the state of containing an organic template to an ion-exchange treatment in a solution containing a cationic species.

In the present invention, a molecular sieve containing an organic template can suffice as long as the organic template has not been substantially all removed by calcination. That is, as long as the calcination of a synthesized molecular sieve is not at all carried out, or it is not calcined under the condition (especially a high temperature) where the organic template is substantially all burned and removed even in the case where the calcination is carried out, before the organic template is removed by the ion-exchange, the molecular sieve can suffice. In the case where a synthesized molecular sieve is calcined in an atmosphere containing molecular oxygen, the calcination temperature is preferably about 500° C. or less, more preferably 450° C. or less, and still more preferably 400° C. or less, so that the organic template is not substantially all burned and removed. Most preferably in the present invention, before the organic template is removed by the ion-exchange, the calcination of the synthesized molecular sieve is not at all carried out.

The case where a molecular sieve containing an organic template is, before subjected to an ion-exchange treatment, calcined under the condition where the organic template is substantially all burned and removed, has a tendency of not providing characteristics the hydroisomerization catalyst of the present invention could have, that is, characteristics by which the cracking of normal paraffins and/or isoparaffins is sufficiently suppressed in a high normal paraffin conversion region in the hydroisomerization reaction of the normal paraffins.

The ion-exchange for obtaining an ion-exchanged molecular sieve constituting the hydroisomerization catalyst of the present invention is carried out by ion-exchanging a molecular sieve containing an organic template preferably in a solution containing water as a main solvent and a cationic species. "Containing water as a main solvent" used here means that the content of the water contained in the solution is 50% by mass or more based on the total amount of solvents in the solution. In the present invention, the water content is preferably 70% by mass or more, and more preferably 100% by mass or more.

In the case where the solution contains an organic solvent, the content thereof is preferably 50% by mass or less, and more preferably 30% by mass or less, based on the total amount of solvents in the solution. With the content of the organic solvent exceeding 50% by mass, for example, the case of using a compound to supply a cationic species for ion-exchange is liable to raise problems such as a decrease in the solubility of the compound to the solvent. Therefore, most preferably, the solution contains no organic solvent.

In a molecular sieve in the hydrothermally synthesized state, there is present generally an alkali metal cation or an alkalin earth metal cation as a counter cation. In the above-mentioned ion-exchange, such a counter cation is also ion-exchanged, and simultaneously, an organic template is also removed reasonably.

A cationic species contained in the solution is not especially limited, and various types of cationic species can be used, but they are preferably proton or ammonium ion in view of forming Bronsted acid sites useful in the catalyst according to the present invention. In the case of using proton as a cationic species, a mineral acid such as hydrochloric acid, sulfuric acid or nitric acid is usually utilized. An ammonium type molecular sieve obtained by ion-exchanging a synthesized molecular sieve in the presence of ammonium ions releases ammonia in a later calcination of a catalyst composition, and counter cations turn to protons to become Bronsted acid sites. Compounds to supply ammonium ions in a solution include various inorganic and organic salts of ammonium such as ammonium chloride, ammonium sulfate, ammonium nitrate, ammonium phosphate and ammonium acetate. The most preferable cationic species in the present invention is ammonium ion. The content of a cationic species contained in a solution is preferably set at 10 to 1,000 equivalent weight with respect to the total amount of an organic template and a counter cation contained in a molecular sieve to be used.

The above-mentioned ion-exchange is carried out preferably by a method in which a powdery synthesized molecular sieve, a molded product of a synthesized molecular sieve or a molded product of a mixture of a synthesized molecular sieve and a binder is immersed in a solution containing a cationic species, preferably in an aqueous solution, and stirred or fluidized.

The stirring or fluidization is preferably carried out under heating to raise the efficiency of the ion-exchange. In the present invention, a method in which an aqueous solution containing a cationic species is heated, and the ion-exchange is carried out under boiling and refluxing is especially preferable.

The time of the ion-exchange depends on other conditions, but is preferably about 1 to 24 hours. The amount of the solution brought into contact with a synthesized molecular sieve is preferably 0.01 L to 10 L based on 1 g of the synthesized molecular sieve in view of the ion-exchange efficiency and the economic efficiency. Further, in view of enhancing the ion-exchange efficiency, during the ion-exchange of the synthesized molecular sieve in the solution, the solution is preferably replaced by a new one once or more, and more preferably once or twice. In the case where the solution is replaced once, for example, a synthesized molecular sieve is immersed in an aqueous solution containing a cationic species; the solution is refluxed under heating for 1 to 6 hours; then, the solution is replaced by a new one; and thereafter, the solution is further refluxed under heating for 6 to 12 hours, enabling to enhance the ion-exchange efficiency.

Preferably, the ion-exchanged molecular sieve is preparatively isolated by filtering or the like, thereafter, washed with deionized water or the like, and dried at about 60 to 130° C. for about 10 to 48 hours.

On the ion-exchanged molecular sieve, at least one metal selected from the group consisting of metals of Groups 8 to 10 of Periodic Table of the elements, molybdenum and tungsten is carried. Preferable metals of Groups 8 to 10 of Periodic Table of the elements include iron, ruthenium, osmium, cobalt, rhodium, iridium, nickel, palladium and platinum. Further, among these, platinum and/or palladium is preferable and platinum is more preferable in view of activity, selectivity and durability of activity. Metals of Groups 8 to 10 of Periodic Table of the elements, molybdenum and tungsten may be used singly or in combination of two or more.

In the case where the hydroisomerization catalyst of the present invention is used for the hydroisomerization of a hydrocarbon oil containing much of a sulfur-containing compound and/or a nitrogen-containing compound, a combination of metals, such as nickel-cobalt, nickel-molybdenum, cobalt-molybdenum, nickel-molybdenum-cobalt or nickel-tungsten-cobalt, carried on an ion-exchanged molecular sieve is preferable in view of durability of the catalyst activity.

Methods in which the above-mentioned metal is carried on an ion-exchanged molecular sieve include well-known methods such as the impregnation methods (equilibrium adsorption method, pore filling method, incipient wetting method) and the ion-exchange method. The compounds containing the above-mentioned metal element component used at this time include hydrochloric salts, sulfuric salts, nitric salts and complex compounds of the metals. Compounds containing platinum include chloroplatinic acid, tetramminedinitroplatinum, dinitroaminoplatinum and tetramminedichloroplatinum.

The carrying amount of the above-mentioned metal on an ion-exchanged molecular sieve is preferably 0.001 to 20% by mass with respect to the mass of the ion-exchanged molecular sieve. With the carrying amount of less than the lower limit, it is difficult to impart a predetermined hydrogenation/dehydrogenation function; by contrast, with that exceeding the upper limit, turning into light oils due to cracking of hydrocarbons on the metal is liable to progress; the yield of target fractions is likely to decrease; and further, the rising of catalyst costs is likely to be invited.

The condition of calcining a catalyst composition containing the ion-exchanged molecular sieve and the metal carried on the ion-exchanged molecular sieve is in an atmosphere containing molecular oxygen, preferably at 250° C. to 600° C., and more preferably at 300 to 500° C. The atmosphere containing molecular oxygen includes, for example, oxygen gas, oxygen gas diluted with an inert gas such as nitrogen gas, and air. The calcination time is usually about 0.5 to 20 hours. Through such a calcination treatment, a compound containing the metal element carried on the ion-exchanged molecular sieve is converted to a metal single substance, its oxide or the like species, whereby the catalyst is imparted the isomerization activity of normal paraffins. If the calcination temperature is out of the above range, the activity and the selectivity of the catalyst are likely to be insufficient.

According to the calcination treatment described above, if an organic template remains on the ion-exchanged molecular sieve, it is also possible to burn and completely remove the remaining organic template. Further, in the present invention, the calcination at a relatively low temperature can sufficiently remove the organic template. This is considered because since the above-mentioned metal having a catalytic capability for oxidation reaction is carried on the ion-exchanged molecular sieve according to the present invention, the action thereof can progress the oxidation reaction (combustion) of the organic template at a lower temperature.

In the case where the ion-exchanged molecular sieve is an ammonium type molecular sieve, the counter cations of ammonium release ammonia to make protons and to form Bronsted acid sites in the above-mentioned calcination process.

The hydroisomerization catalyst according to the present invention is, following the above-mentioned calcination treatment, preferably a hydroisomerization catalyst subjected to a reduction treatment preferably in an atmosphere containing molecular hydrogen, at 250 to 500° C., more preferably 300 to 400° C., for about 0.5 to 5 hours. Through such processes, a high activity for dewaxing hydrocarbon oils can be securely imparted to the catalyst.

In the hydroisomerization catalyst according to the present invention, the catalyst composition is preferably molded in a predetermined shape. The shapes include, for example, a cylindrical shape, pelletized shape, spherical shape, and deformed cylindrical shape having three-leaved or four-leaved cross-section. Molding the catalyst composition in such a shape enhances mechanical strengths of the catalyst obtained by calcination, improves the handleability of the catalyst, and allows for reduction of the pressure loss of a reaction fluid in the reaction. For molding of the catalyst composition, a well-known method is utilized.

The content of an ion-exchanged molecular sieve or a calcined product thereof in a catalyst composition is preferably 1 to 90% by mass, and more preferably 10 to 80% by mass, based on the total amount of the catalyst composition.

Further, the catalyst composition preferably comprises at least one porous oxide selected from the group consisting of alumina, silica, titania, boria, magnesia and zirconia in view of improving moldability of the catalyst and mechanical strengths of the molded catalyst. In this case, the content proportions of an ion-exchanged molecular sieve and the porous oxide in the catalyst composition are preferably 1 to 90% by mass and 99 to 10% by mass, and more preferably 10 to 80% by mass and 90 to 20% by mass, respectively. In the hydroisomerization catalyst according to the present invention, in the case where the catalyst composition comprises a calcined product of an ion-exchanged molecular sieve and the above-mentioned metal carried on the calcined product, the calcined product of an ion-exchanged molecular sieve may be contained in a catalyst composition as a carrier obtained by calcining a carrier composition comprising the ion-exchanged molecular sieve, and the metal carried on the calcined product may be contained in a form carried on the carrier in the catalyst composition.

In the case where the above-mentioned porous oxide is contained in a catalyst composition, a carrier comprising a carrier composition containing an ion-exchanged molecular sieve and a porous oxide may be molded before the above-mentioned metal is carried on the ion-exchanged molecular sieve, or the ion-exchanged molecular sieve carrying the metal, and the porous oxide may be mixed and molded. In the present invention, the former is preferable. That is, preferably, after a synthesized molecular sieve containing an organic template is ion-exchanged in a solution containing a cationic species, a carrier composition obtained by mixing this ion-exchanged molecular sieve, the above-mentioned porous oxide, and optionally other binder components is molded. The obtained molded product is preferably calcined in an atmosphere containing molecular oxygen to bring out solid acids of the porous oxide. Further, the catalyst composition preferably comprises: a carrier obtained by molding and calcining a carrier composition comprising 1 part by mass to 90 parts by mass of the ion-exchanged molecular sieve and 99 parts by mass to 10 parts by mass of at least one porous oxide selected from the group consisting of alumina, silica, titania, boria, magnesia and zirconia; and the above-mentioned metal carried on the carrier.

In the hydroisomerization catalyst according to the present invention, a metal other than metals of Groups 8 to 10 of Periodic Table of the elements, molybdenum and tungsten may further be carried on the ion-exchanged molecular sieve or a calcined product thereof in the range of not damaging the advantages of the present invention. Further, in the case where the catalyst composition comprises a porous oxide, a metal other than metals of Groups 8 to 10 of Periodic Table of the elements, molybdenum and tungsten may further be carried on the ion-exchanged molecular sieve or a calcined product thereof and/or the porous oxide.

<Manufacturing method of the hydroisomerization catalyst>

Then, a method for manufacturing the hydroisomerization catalyst of the present invention will be described.

A method of manufacturing a hydroisomerization catalyst of the present invention, comprising: a step a of hydrothermally synthesizing a molecular sieve comprising a nanocrystal having a pore structure of ten-membered rings or eight-membered rings and having a ratio of the pore volume to the external surface area ([pore volume]/[external surface area]) of $2.0 \times 10^{-4}$ mL/m$^2$ to $8.0 \times 10^{-4}$ mL/m$^2$ and comprising an organic template; a step b of ion-exchanging the molecular sieve comprising an organic template in a solution containing a cationic species to obtain an ion-exchanged molecular sieve; a step c of making the ion-exchanged molecular sieve or the calcined product thereof carry at least one metal selected from the group consisting of metals of Groups 8 to 10 in Periodic Table of the elements, molybdenum and tungsten to obtain a catalyst composition; and a step d of calcining the catalyst composition.

A method for synthesizing the molecular sieve containing an organic template in the step a described above include the method described in the description of the hydroisomerization catalyst of the present invention. The molecular sieve is preferably synthesized by suitably controlling the hydrothermal synthesis time, temperature and the like so that the length in the shorter axis direction of nanocrystals is in the range of 5 to 25 nm.

A method for ion-exchanging the molecular sieve containing an organic template in the step b described above includes the method described in the description of the hydroisomerization catalyst of the present invention.

A method for making the above-mentioned metal carried on an ion-exchanged molecular sieve or a calcined product thereof in the step c described above includes the method described in the description of the hydroisomerization catalyst of the present invention.

In the manufacturing method of the hydroisomerization catalyst of the present invention, the step c described above preferably comprises making a carrier, which is obtained by calcining a carrier composition comprising 1 part by mass to 90 parts by mass of the ion-exchanged molecular sieve or the calcined product thereof and 99 parts by mass to 10 parts by mass of at least one porous oxide selected from the group consisting of alumina, silica, titania, boria, magnesia and zirconia, carry at least one metal selected from the group consisting of metals of Groups 8 to 10 in Periodic Table of the elements, molybdenum and tungsten to obtain the catalyst composition.

A method for calcining the catalyst composition in the step d described above includes the method described in the description of the hydroisomerization catalyst of the present invention.

Further, in the manufacturing method of the hydroisomerization catalyst of the present invention, after the calcination of the catalyst composition in the step d described above, the catalyst is preferably subjected to a reduction treatment preferably in an atmosphere containing molecular hydrogen, at 250 to 500° C., more preferably 300 to 400° C., for about 0.5 to 5 hours. Through such steps, a high activity for dewaxing hydrocarbon oils can be imparted more securely.

The greatest feature of the hydroisomerization catalyst of the present invention lies in that the hydroisomerization catalyst is constituted of an ion-exchanged molecular sieve obtained by ion-exchanging a specified molecular sieve having a morphology of nanocrystals in the state containing an organic template. A hydroisomerization catalyst constituted of a molecular sieve having a morphology of nanocrystals, as described in the final paragraph on the left column in page 10074, and "Table 2" in Non-Patent Document 2 shown before, more decreases in the isomerization (and cracking) activity of normal paraffins than a similar catalyst constituted of a molecular sieve having a form of usual crystals.

By contrast, although the hydroisomerization catalyst of the present invention more decreases in the activity than a similar catalyst constituted of a conventional ion-exchanged molecular sieve having usual crystals and obtained by ion-exchange after removal of an organic template by calcination, it largely increases in the isomerization selectivity, and exhibits a remarkably high isomerization selectivity especially in a high normal paraffin conversion range. Therefore, the hydroisomerization catalyst of the present invention can improve the yield of an isomerized product in a high normal paraffin conversion range.

The present inventors have found that although a hydroisomerization catalyst constituted of an ion-exchanged molecular sieve obtained by ion-exchanging a specified molecular sieve having a usual crystal morphology in the state containing an organic template slightly more decreases in the activity than a similar catalyst constituted of a conventional ion-exchanged molecular sieve, it improves in the isomerization selectivity (isomerization activity/(isomerization activity+cracking activity). By contrast, the hydroisomerization catalyst of the present invention allows for further improvement in the isomerization selectivity, and can further improve the yield of an isomerized product in a high normal paraffin conversion region.

In the hydroisomerization catalyst of the present invention, the mechanism to develop the feature as described above cannot be definitely said, but the present inventors surmise as follows.

Acid sites in a molecular sieve are considered to include those contributing to the isomerization of normal paraffins and those contributing to the cracking of normal paraffins. A theory is proposed in which the former sites are acid sites existing in the vicinity of pore entrances of the molecular sieve and the latter sites are acid sites existing in the interior of pores. The latter is considered to decompose also isoparaffins having a few branches produced by the isomerization. A molecular sieve having a morphology of nanocrystals is considered to have fewer of both the acid sites than a molecular sieve having a morphology of aggregated crystals, and to be lower in the isomerization activity and the cracking activity as well.

By contrast, although a hydroisomerization catalyst constituted of an ion-exchanged molecular sieve obtained by ion-exchanging a molecular sieve containing an organic template more decreases in the isomerization activity than a similar catalyst constituted of a conventional ion-exchanged molecular sieve obtained by ion-exchange after removal of an organic template by calcination, the cracking activity decreases more than that decrease, resulting in having a high isomerization selectivity. This is presumably because the former catalyst can more hardly produce acid sites in pores than the latter catalyst for some reason.

In the hydroisomerization catalyst of the present invention, since a molecular sieve having a morphology of nanocrystals is ion-exchanged in the state of containing an organic template, the production amount of acid sites in the interior of pores is presumably small, and the present inventors presume that the isomerization selectivity is thereby improved to such a degree that the isomer yield is kept high even in a high normal paraffin conversion region.

Application of the hydroisomerization catalyst of the present invention to the hydroisomerization of hydrocarbon oils containing high-boiling point normal paraffins as a main component enables to manufacture, with an economical yield, high-boiling point isoparaffin fractions containing substantially no normal paraffin, which is required especially for high-performance lube-oil base oils.

<Dewaxing method of hydrocarbon oils>

Then, a method for dewaxing hydrocarbon oils of the present invention will be described. The method for dewaxing hydrocarbon oils of the present invention comprises a step of bringing the hydrocarbon oils containing normal paraffins having 10 or more carbon atoms into contact with the hydroisomerization catalyst of the present invention in the presence of hydrogen to convert a part of or the whole of the normal paraffins into isoparaffins.

Hydrocarbon oils used in the dewaxing method of the hydrocarbon oils of the present invention are not especially limited as long as the hydrocarbon oils contain normal paraffins having 10 or more, preferably 15 or more, carbon atoms. The hydrocarbon oils specifically include various ones from relatively light distillate fractions such as kerosene and jet fuel to all crude oils, atmospheric distillation residual oils, vacuum column residual oils, reduced pressure residual oils, cycle stocks, synthetic crude oils (for example, shale oil and tar oil), gas oils, vacuum gas oils, foot's oils, fuel fractions and wax fractions derived from FT synthesized oils, and to high-boiling point raw oils such as other heavy oils. These hydrocarbon oils may contain wax components composed of naphthenic hydrocarbons having a long straight-chain alkyl group as side chains, or aromatic hydrocarbons, other than normal paraffins.

Especially preferable hydrocarbon oils to be dewaxed by the dewaxing method of hydrocarbon oils of the present invention are those constituted of hydrocarbons having a boiling point of 180° C. or more and having 10 or more carbon atoms. Since hydrocarbon oils lighter than these usually contain substantially no wax components affecting the cold flow property, the necessity of dewaxing is low, hardly providing the advantages of the present invention.

On the other hand, the application of the dewaxing method according to the present invention is especially effective to fractions of distillate raw oils containing wax components, i.e. intermediate oil fraction raw oils including gas oils, kerosenes and jet fuels, lube-oil raw oils, oils for air heating, and other distillate fractions, whose pour points and viscosities must be kept in a predetermined range. Such hydrocarbon oils include, for example, gas oils subjected to a hydrotreating or a hydrocracking, heavy gas oils, vacuum gas oils, lube-oil raffinates, lube-oil raw materials, bright stocks, slack waxes, foot's oils, deoiled waxes, paraffin waxes, microcrystalline waxes, petrolatums, synthetic oils, FT synthetic oils, high-pour point polyolefins, and straight-chain α-olefin waxes. These can be used singly or in combination of two or more.

The temperature of the hydroisomerization reaction in the dewaxing method of hydrocarbon oils of the present invention is generally 200 to 450° C., and preferably 220 to 400° C. With the reaction temperature below 200° C., the isomerization of normal paraffins contained in hydrocarbon oils as a raw material hardly progresses and the reduction and removal of wax components are likely to be insufficient. By contrast, with the reaction temperature exceeding 450° C., the cracking of the hydrocarbon oils becomes remarkable and the yield of target base oils is likely to decrease.

The pressure of the hydroisomerization reaction in dewaxing of hydrocarbon oils of the present invention is generally 0.1 to 20 MPa, and preferably 0.5 to 15 MPa. With the pressure below 0.1 MPa, the degradation of the catalyst due to coke production is likely to become fast. By contrast, with the pressure exceeding 20 MPa, an economical process is likely to be hardly achieved because of high facility building costs.

The liquid space velocity of hydrocarbon oils with respect to the catalyst in the hydroisomerization reaction in the dewaxing method of hydrocarbon oils of the present invention is generally 0.01 to 100 $hr^{-1}$, and preferably 0.1 to 50 $hr^{-1}$. With the liquid space velocity of less than 0.01 $hr^{-1}$, the cracking of the hydrocarbon oils is liable to excessively progress and the production efficiency of target base oils is likely to decrease. By contrast, with the liquid space velocity exceeding 100 $hr^{-1}$, the isomerization of normal paraffins contained in the hydrocarbon oils hardly progress and the reduction and removal of wax components are likely to be insufficient.

The supply ratio of hydrogen and a hydrocarbon oil in the hydroisomerization reaction in the dewaxing method of hydrocarbon oils of the present invention is generally 100 to 1,000 $Nm^3/m^3$, and preferably 200 to 800 $Nm^3/m^3$. With the supply ratio of less than 100 $Nm^3/m^3$, for example, in the case where a raw oil contains a sulfur and nitrogen compounds, since hydrogen sulfide and ammonia gases generated by desulfurization and denitrification reactions occurring simultaneously with the isomerization reaction are adsorbed on and poison an active metal on the catalyst, a predetermined catalyst performance is likely to be hardly provided. By contrast, with the supply ratio exceeding 1,000 $Nm^3/m^3$, an economical process is likely to be hardly achieved because a large-capacity hydrogen supply facility is needed.

The conversion of normal paraffins in the hydroisomerization reaction in the dewaxing method of hydrocarbon oils of the present invention is suitably controlled depending on applications of target base oils.

<Manufacturing method of lube-oil base oils>

Then, a method for manufacturing lube-oil base oils of the present invention will be described. The method for manufacturing lube-oil base oils of the present invention has such a feature that a hydrocarbon oil containing normal paraffins having 10 or more carbon atoms is brought into contact with the hydroisomerization catalyst of the present invention in the presence of hydrogen under such a condition that the conversion of the normal paraffins defined by the formula (I) described below is substantially 100% by mass. Here, "conversion is substantially 100% by mass" means that the content of normal paraffins contained in the hydrocarbon oil after the contact is 0.1% by mass or less.

[Expression 2]

$$\text{Conversion of normal paraffins (\%)} = [1-(\text{total mass \% of normal paraffins having Cn or more carbon atoms contained in a hydrocarbon oil after the contact})/(\text{total mass \% of normal paraffins having Cn or more carbon atoms contained in the hydrocarbon oil before the contact})] \times 100 \quad (I)$$

wherein Cn denotes a minimum number of carbon atoms of normal paraffins having 10 or more carbon atoms contained in the hydrocarbon oil before the contact.

Hydrocarbon oils used in the manufacturing method of lube-oil base oils of the present invention are not especially limited as long as they contain normal paraffins having 10 or more carbon atoms, but preferably contain a hydrocarbon oil having a higher initial boiling point than that of desired lube-oil base oils. As such raw oils suitable are petroleum fractions and synthetic oils and waxes whose boiling points exceed 360° C. in terms of ambient pressure. They specifically include heavy gas oils, vacuum gas oils, lube-oil raffinates, bright stocks, slack waxes, foot's oils, deoiled waxes, paraffin waxes, microcrystalline waxes, petrolatums, synthetic oils, FT synthetic oils, high-pour point polyolefins, and straight-chain α-olefin waxes. These can be used singly or in combination of two or more. Further, these oils are preferably those having been subjected to a hydrotreating or a mild hydrocracking. These treatments can reduce or remove substances causing activity reduction of the hydroisomerization catalyst, such as sulfur-containing compounds and nitrogen-containing compounds, and substances decreasing the viscosity indexes of lube-oil base oils such as aromatic hydrocarbons and naphthenic hydrocarbons.

By using a relatively heavy hydrocarbon oil described above as a raw oil and bringing it into contact with the hydroisomerization catalyst according to the present invention in the presence of hydrogen, the isomerization of normal paraffins contained in the hydrocarbon oil, that is, the dewaxing reaction of the hydrocarbon oil, can be progressed while turning into light oils is sufficiently suppressed. Thereby, a lube-oil base oil in which the proportion of fractions thereof whose boiling points exceed 360° C. in terms of ambient pressure is 90% by volume or more can be provided with a high yield. The manufacturing method of lube-oil base oils according to the present invention can provide a lube-oil base oil containing much of isomers having a branched-chain structure. Although, particularly, high-quality lube-oil base oils are required to have a content of normal paraffins of 0.1% by mass or less, the manufacturing method of lube-oil base oils according to the present invention can provide a lube-oil base oil satisfying the requirement with a high yield.

In the hydroisomerization of a hydrocarbon oil containing normal paraffins, usually since, for example, raising the reaction temperature can increase the conversion of the normal paraffins, and decrease the normal paraffin content in the reaction product, the cold flow property of the hydrocarbon oil can be improved. However, since raising the reaction temperature promotes the cracking of the hydrocarbon oil as the raw material and the isomerized product, light fractions increase along with the rising conversion of the normal paraffins. Since the increase in light fractions causes a decrease in the viscosity index of the hydrocarbon oil, the light fractions must be separated and removed by distillation or the like in order to fall the performance as a lube-oil base oil in a predetermined range. Particularly in the case where high-performance lube-oil base oils such as Group III+ according to the classification of lube-oil grades by American Petroleum Institute are manufactured by catalytic dewaxing of hydrocarbon oils, the normal paraffin conversion in the hydrocarbon oils as a raw material must be substantially 100%. By manufacturing methods of lube-oil base oils using a conventional catalyst for catalytic dewaxing, under the condition that the normal paraffin conversion is substantially 100%, the yield of the above-mentioned high-performance lube-oil base oil is extremely low. By contrast, by the manufacturing method of lube-oil base oils of the present invention, even if the hydrotreating process is carried out under the condition that the normal paraffin conversion is substantially 100%, the yield of the above-mentioned high-performance lube-oil base oil can be held at a high level.

Facilities to conduct the dewaxing method of hydrocarbon oils and the manufacturing method of lube-oil base oils of the present invention are not especially limited, and well-known ones can be used. A reaction facility may be any of a continuous circulation system, a batch system and a semibatch system, but is preferably of a continuous circulation system in view of productivity and efficiency. A catalyst layer may be any of a fixed bed, a fluidized bed and an agitated bed, but is preferably of a fixed bed in view of the facility cost and the like. A reaction phase is preferably a vapor-liquid mixed phase.

In the dewaxing method of hydrocarbon oils and the manufacturing method of lube-oil base oils of the present invention, as a prestage of the dewaxing step by the above-mentioned hydroisomerization reaction, hydrocarbon oils as a supplied raw material may be subjected to a hydrotreating or a hydrocracking treatment. As the facility, catalyst and reaction condition, well-known ones can be used. By conducting these pretreatments, the activity of the hydroisomerization catalyst of the present invention can be maintained over a long period, and can reduce environmental load substances in products such as sulfur- and nitrogen-containing compounds.

Further, in the manufacturing method of lube-oil base oils of the present invention, a reaction product obtained by the above-mentioned dewaxing process is further subjected to a treatment, for example, hydrofinishing. The hydrofinishing can generally be carried out by bringing a product to be hydrofinished into contact with a carried metal hydrogenation catalyst (for example, platinum carried on alumina) in the presence of hydrogen. Conducting such a hydrofinishing can improve the hue, oxidation stability and the like of a reaction product obtained by the dewaxing process, thus improving the quality of a product. The hydrofinishing may be carried out in a reaction facility separated from the dewaxing process, but may be carried out following the dewaxing process by providing a catalyst layer for hydrofinishing downstream of a catalyst layer of the hydroisomerization catalyst according to the present invention provided in a reactor to conduct the dewaxing process.

Usually, "isomerization" refers to a reaction in which the number of carbons (molecular weight) does not change and only the molecular structure changes, and "cracking" refers to a reaction involving a decrease in the number of carbons (molecular weight). In a catalytic dewaxing reaction utilizing the isomerization reaction, even if the cracking of hydrocarbons as a feed stock and an isomerized product is generated to some extent, the cracking is allowed as long as it falls within a predetermined range where the number of carbons (molecular weight) of the cracking products is allowed to constitute a target base oil, and the cracking products are allowed to be constituent of the base oil.

EXAMPLES

Hereinafter, the present invention will be described further in detail by way of Examples, but the scope of the present invention is not limited to these Examples.

Example 1 and Comparative Examples 1 to 7

1. Evaluation of Catalysts by Model Reactions
1-1. Manufacture of Catalysts
1-1-1. Manufacture of ZSM-22 Type Zeolite ZSM-22 type zeolite composed of a crystalline aluminosilicate having a Si/Al ratio of 30 was manufactured by the following procedure according to the method described in page 1007, "Experimental Section" of Non-Patent Document 2 shown before.

First, the following four kinds of aqueous solutions were prepared.
Solution A: a solution obtained by dissolving 1.94 g of potassium hydroxide in 6.75 mL of ion-exchange water.
Solution B: a solution obtained by dissolving 1.33 g of aluminum sulfate octadecahydrate in 5 mL of ion-exchange water.
Solution C: a solution obtained by dissolving 4.18 g of 1,6-hexadiamine (organic template) in 32.5 mL of ion-exchange water.
Solution D: a solution obtained by dissolving 18 g of a colloidal silica (made by Grace Davison Co., Ludox AS-40) in 31 mL of ion-exchange water.

Then, Solution A was added to Solution B and stirred till the aluminum component was completely dissolved. Solution C was added to the mixed solution, and thereafter, the mixture of Solutions A, B and C was poured in Solution D under vigorous stirring at room temperature. Further, thereto, 0.25 g of a powder of ZSM-22 which had been synthesized separately and had not been subjected to any special treatment after the synthesis was added as a "seed crystal" to promote the crystallization to obtain a gelatinous material.

Further three gelatinous materials having the same composition as the above were prepared as in the above-mentioned operation. The four gelatinous materials were transferred in four stainless steel autoclave reactors of 120 mL in internal volume, and subjected to a hydrothermal synthesis reaction, respectively, for 27 hours, 29 hours, 31 hours and 33 hours while the autoclave reactors were rotated at a rotation frequency of about 60 rpm on a tumbling apparatus in an oven at 150° C. After the finish of the respective reactions, the reactors were cooled; respective solid contents produced in the respective reactors were sampled by filtration, washed with ion-exchange water, and dried overnight in a drier at 60° C. to obtain four kinds of ZSM-22 having a Si/Al ratio of 30.

1-1-2. Ion-Exchange of ZSM-22 Containing an Organic Template

The four kinds of ZSM-22 obtained as described above were each partly sampled and each was subjected to an ion-exchange treatment in an aqueous solution containing ammonium ions by the following operation.

ZSM-22 obtained as described above were each charged in a flask, and 100 mL of a 0.5N ammonium chloride aqueous solution was added thereto with respect to 1 g of each ZSM-22, and refluxed under heating for 6 hours. After the solution was cooled to room temperature, a supernatant solution was removed, and a crystalline aluminosilicate was washed with ion-exchange water. Then, the same amount of the 0.5N ammonium chloride aqueous solution was again added thereto, and refluxed under heating for 12 hours.

Thereafter, respective solid contents were sampled by filtration, washed with ion-exchange water, and dried overnight in a drier at 60° C. to obtain respective ion-exchanged $NH_4$ type ZSM-22. These ZSM-22 are those ion-exchanged in the state containing an organic template. Hereinafter, the respective ion-exchanged $NH_4$ type ZSM-22 obtained as described above are denoted as "ZSM-22[27]IE", "ZSM-22[29]IE", "ZSM-22[31]IE", and "ZSM-22[33]IE", respectively. Here, IE expresses having been ion-exchanged in the state containing an organic template without calcination, and a numeral in [ ] expresses a hydrothermal synthesis time.

1-1-3. Ion-Exchange After Removal of the Organic Template by Calcination

Four kinds of ZSM-22 obtained as described above were each filled in a quartz tube furnace, and heated at a rate of 5° C./min to 400° C. in a nitrogen gas flow, and held in the conditions for 6 hours. Thereafter, the circulating gas was changed over to oxygen gas; and the ZSM-22 was further heated at 5° C./min to 550° C., and held overnight in the conditions at 550° C. Here, the calcination of the organic template in a nitrogen gas flow at 400° C. converts it to a carbonaceous substance mainly through hydrogen release by decomposition of the organic template; and the calcination in an oxygen gas flow at 550° C. removes the organic template through oxidation (combustion) of the carbonaceous substance. Conducting such two-stage calcination is considered to be able to more effectively eliminate an influence of steaming by steam generated by combustion of the organic template than the case of direct calcination in an oxygen gas flow.

The respective calcined ZSM-22 were cooled to room temperature, and thereafter each was transferred to a flask; and a 0.5N ammonium chloride aqueous solution was added thereto, and refluxed overnight under heating to ion-exchange the ZSM-22. After the finish of the ion-exchange, respective solid contents were sampled by filtration, washed with ion-exchange water, and dried overnight in a drier at 60° C. to obtain respective $NH_4$ type ZSM-22. These ZSM-22 are those ion-exchanged in the state containing no organic template. Hereinafter, the respective ion-exchanged $NH_4$ type ZSM-22 obtained as described above are denoted as "ZSM-22[27]C-IE", "ZSM-22[29]C-IE", "ZSM-22[31]C-IE", and "ZSM-22[33]C-IE", respectively. Here, C-IE expresses having been ion-exchanged in the state containing no organic template by the calcination, and a numeral in [ ] expresses a hydrothermal synthesis time.

With respect to each ZSM-22 obtained as described above, the BET surface area, the external surface area and the pore volume were quantitatively determined by experiments of nitrogen adsorption at −196° C. Details of the determination method are as described in "Experimental Section" in Non-Patent Document 2 shown before. From the results, "pore volume/external surface area" as an index of judgment on nanocrystals was calculated. The results are shown in Table 1.

TABLE 1

|  | Hydrothermal Synthesis Time (h) | | | |
| --- | --- | --- | --- | --- |
|  | 27 | 29 | 31 | 33 |
| Treatment after Hydrothermal Synthesis | C-IE | C-IE | C-IE | C-IE |
| BET Surface Area ($m^2/g$) | 273 | 266 | 256 | 250 |
| External Surface Area ($m^2/g$) | 132 | 84 | 80 | 62 |
| Pore Volume (ml/g) | 0.064 | 0.084 | 0.081 | 0.087 |
| Pore Volume/External Surface Area × $10^4$ ($ml/m^2$) | 4.8 | 10 | 10 | 14 |

ZSM-22 of 27 hours in hydrothermal synthesis time has a large external surface area (132 $m^2/g$) and a small pore volume (0.064 mL/g), which exhibits characteristics of nanocrystals. On the other hand, ZSM-22 of 29 hours, 31 hours and 33 hours in hydrothermal synthesis time have small external surface areas (62 to 84 $m^2/g$) and large pore volumes (0.081 to 0.087 mL/g), which reveals that the aggregation of nanocrystals has already occurred. That is, the above results indicate that the aggregation of nanocrystals sharply advances between 27 hours and 29 hours in hydrothermal synthesis time.

1-1-4. Making Platinum Carried on ZSM-22, and Molding

Each of "ZSM-22[27]IE", "ZSM-22[29]IE", "ZSM-22 [31]IE", "ZSM-22[33]IE", "ZSM-22 [27]C-IE", "ZSM-22 [29]C-IE", "ZSM-22[31]C-IE" and "ZSM-22[33]C-IE" obtained as described above was made to carry platinum and molded by the following method.

First, tetramminedichloroplatinum (II) (Pt(NH$_3$)$_4$Cl$_2$) was dissolved in an amount at minimum of ion-exchange water. The solution was impregnated in the respective NH$_4$ type ZSM-22 by the incipient wetness method to make the ZSM-22 carry platinum such that the platinum amount is 0.3% by mass with respect to the mass of the ZSM-22. Then, these were dried overnight in a drier at 60° C., and thereafter molded into a disc shape by tableting molding, and further pulverized and sieved into amorphous powdery products having a maximum particle size of 125 to 250 μm.

1-1-5. Activation of Catalysts 50 mg of each of the platinum-carrying NH$_4$ type ZSM-22 obtained as described above was filled in a microreactor used for reaction (its detail will be described later), calcined in an oxygen gas flow at 400° C. for 1 hour, and then subjected to a reduction treatment in a hydrogen gas flow for 1 hour to activate a catalyst.

Here, the respective ZSM-22 in which platinum is carried and counter ions are turned to protons by the activation treatment are denoted as "Pt/H-ZSM-22[27]IE", "Pt/H-ZSM-22[27]C-IE", and so on.

1-2. Evaluation of Catalysts by the Isomerization Reaction Using Normal Decane

Each catalyst obtained as described above was evaluated for catalytic characteristics by the isomerization reaction using normal decane.

1-2-1. Reaction Apparatus

The reaction was carried out using a fixed bed type microreactor, described before, composed of a stainless steel tube of 2.1 mm in inner diameter and 30 mm in length. 50 mg of a catalyst was filled in the lowermost part. Oxygen gas and hydrogen gas for activating the catalyst, nitrogen gas for purging, and a hydrogen gas containing normal decane vapor as a reaction raw material were changed over by valves, and supplied to the microreactor. Normal decane as a reaction raw material was supplied to the microreactor, accompanying the hydrogen gas by passing the hydrogen gas through a normal decane saturating apparatus heated at a certain temperature, and the reaction was carried out in a vapor phase. The reaction product gas was sampled by a sampling valve which was installed downstream of the microreactor and whose pressure was controlled, and fed for analysis to a gas chromatographic device (GC) equipped with a multicapillary column with a stationary phase of dimethylpolysiloxane.

1-2-2. Reaction Operations

In the reaction apparatus described above, with respect to the activation of a catalyst and the reaction of normal decane, a series of operations of the gas selection, gas flow rate, reaction temperature, selection of valves, sampling of a reaction product, the operation of GC and the like was carried out. The basic operations involve, first, carrying out the activation treatment of a catalyst at 400° C., purging the system by nitrogen gas and varying the microreactor temperature to 150° C., and thereafter introducing a hydrogen gas containing normal decane vapor to initiate the isomerization reaction. The reaction product gas was sampled after 1 hour, and analyzed; the reaction temperature was varied to 160° C., and after stabilization for 1 hour, the reaction product gas was again sampled, and analyzed. Hereafter, the reaction temperature was raised 10° C. by 10° C.; the stabilization and the analysis of the product were repeated to the reaction temperature of 300° C.

1-2-3. Reaction Conditions

The isomerization reaction of normal decane in the presence of hydrogen was carried out under the following conditions.

Raw material normal decane: a reagent (purity: 99% or more) was used as it was.

Reaction pressure: 0.45 MPa

Hydrogen/normal decane ratio: 375 mol/mol

Reaction temperature: 150 to 300° C., temperature rise 10° C. by 10° C.

1-2-4. Reaction Results

The results of normal decane conversion (% by mass) and the C10-isomer yields (% by mass) obtained from the isomerization reaction described above using normal decane are shown in FIG. 1 and FIG. 2. The normal decane conversion and the C10-isomer yield are defined by the formulae shown below.

Normal decane conversion (% by mass)=[100−normal decane content in a reaction product (% by mass)]

C10-isomer yield (% by mass)=[C10 isoparaffin total content in a reaction product (% by mass)]

FIG. 1(a) is a diagram in which the normal decane conversion (dashed lines) and the C10-isomer (isodecane) yields (solid lines) are plotted vs. the reaction temperature for the isomerization reaction of normal decane using Pt/H-ZSM-22[27]IE (Example 1) and the isomerization reaction of normal decane using Pt/H-ZSM-22[27]C-IE (Comparative Example 1); and FIG. 1(b) is a diagram in which the normal decane conversion (dashed lines) and the C10-isomer (isodecane) yields (solid lines) are plotted vs. the reaction temperature for the isomerization reaction of normal decane using Pt/H-ZSM-22[29]IE (Comparative Example 2) and the isomerization reaction of normal decane using Pt/H-ZSM-22[29]C-IE (Comparative Example 3). FIG. 2(a) is a diagram in which the normal decane conversion (dashed lines) and the C10-isomer (isodecane) yields (solid lines) are plotted vs. the reaction temperature for the isomerization reaction of normal decane using Pt/H-ZSM-22[31]IE (Comparative Example 4) and the isomerization reaction of normal decane using Pt/H-ZSM-22[31]C-IE (Comparative Example 5); and FIG. 2(b) is a diagram in which the normal decane conversion (dashed lines) and the C10-isomer (isodecane) yields (solid lines) are plotted vs. the reaction temperature for the isomerization reaction of normal decane using Pt/H-ZSM-22[33]IE (Comparative Example 6) and the isomerization reaction of normal decane using Pt/H-ZSM-22[33]C-IE (Comparative Example 7). In plots in the Figures, ○ denotes the reaction using the catalyst constituted of ZSM-22 by the "IE" treatment; and □ denotes the reaction using the catalyst constituted of ZSM-22 by the "C-IE" treatment.

Figure 1:
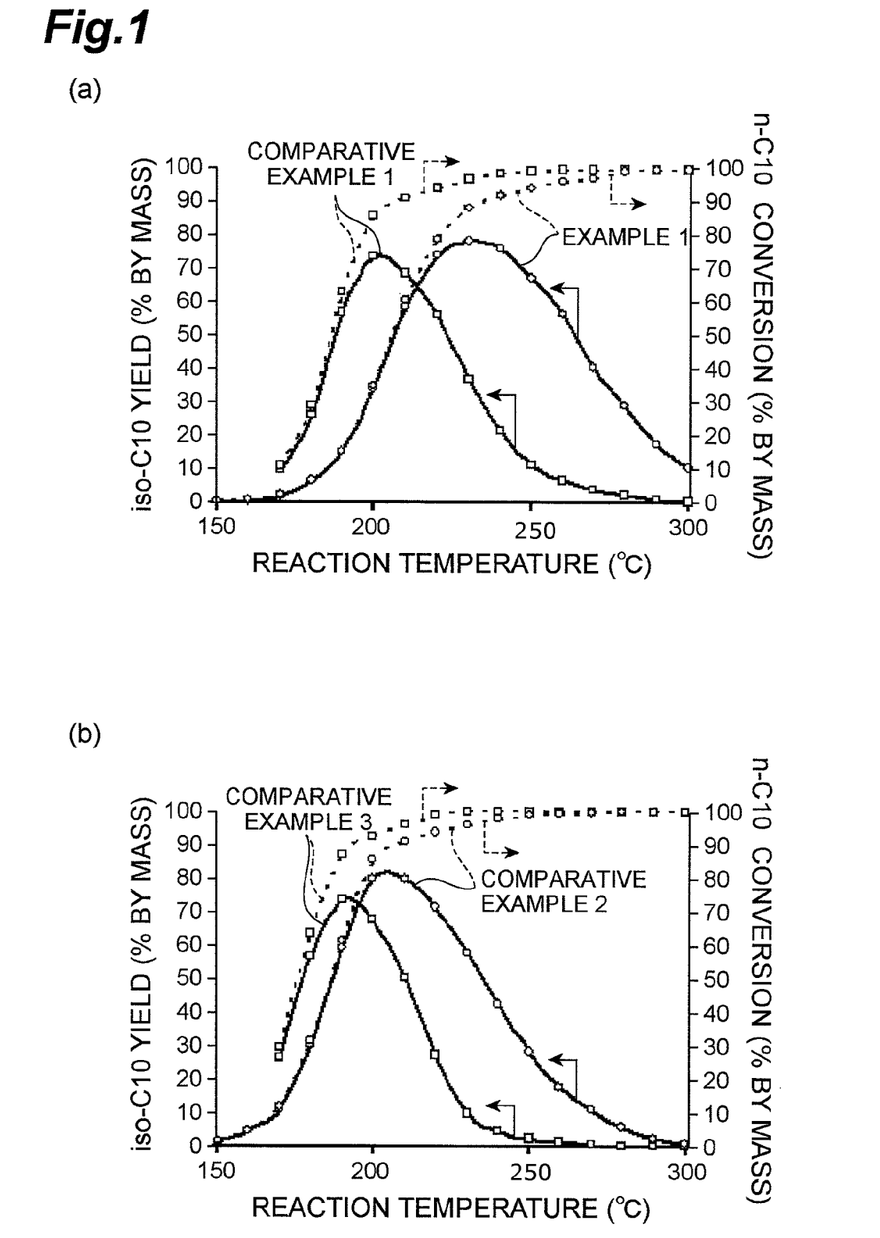
FIG. 1 is a plot diagram showing the normal decane conversion and the C10-isomer yield obtained from an isomerization reaction using normal decane vs. the reaction temperature.

As shown in FIG. 1 and FIG. 2, it is found that the catalyst constituted of ZSM-22[27]C-IE composed of nanocrystals more decreases in the activity (the curve of the normal decane conversion shifts to a higher temperature side) than the catalysts constituted of ZSM-22[29]C-IE, ZSM-22[31]C-IE and ZSM-22[33]C-IE which are aggregated crystals of nanocrystals. It is further found that although the catalyst constituted of the IE-treated ZSM-22 more decreases in the activity than the catalyst constituted of the C-IE-treated ZSM-22, the former catalyst improves in the isomerization selectivity and increases in the maximum value of the C10-isomer yield. This tendency is found in the cases where ZSM-22 is nanocrystals and also where it is aggregated crystals. Further, the catalyst (Pt/H-ZSM-22[27]IE) (a catalyst according to Example 1) constituted of ZSM-22[27]IE composed of nanocrystals exhibits a C10-isomer yield curve wide with respect to the reaction temperature, and indicates high isomer yields over a wide reaction temperature. Particularly in the range where the reaction temperature is high and the normal decane conversion is high (near 100%), the catalyst is confirmed to provide a higher C10-isomer yield than the other catalysts (the catalysts according to Comparative Examples 1 to 7).

Example 2

2. Manufacture of a Lube-Oil Base Oil by Dewaxing a Wax

A hydroisomerization catalyst was manufactured by using the ZSM-22[27]IE obtained as described above as a constituent and molding it together with a binder; and a wax originated from a petroleum was dewaxed by the hydroisomerization using the catalyst to manufacture a lube-oil base oil.

2-1. Manufacture of a Catalyst
2-1-1. Manufacture of ZSM-22[27]IE

ZSM-22[27]IE was prepared as in Example 1.

2-1-2. Binder Formulation, Molding, and Calcination

ZSM-22[27]IE and alumina as a binder were formulated in a mass ratio of ZSM-22[27]IE:alumina of 70:30; and a small amount of ion-exchange water was added thereto, and the mixture was kneaded, and molded by extrusion molding to obtain a cylindrical molded product of about 1.5 mm in diameter and about 5 mm in length. Then, the molded product was calcined in an air flow at 400° C. for 3 hours.

2-1-3. Platinum Carrying, and Calcination

The calcined molded product obtained as described above was impregnated with an aqueous solution of tetramminedichloroplatinum by the incipient wetness method to make platinum carried such that the carried amount of platinum was 0.5% by mass with respect to the mass of ZSM-22[27] IE. Further, the platinum-carried product was calcined in an air flow at 400° C. for 3 hours to obtain a hydroisomerization catalyst.

2-1-4. Activation of the Catalyst 100 mL of the hydroisomerization catalyst was filled in a stainless steel tube of 15 mm in inner diameter and 380 mm in length, and subjected to a reduction treatment in a hydrogen flow (hydrogen partial pressure: 3 MPa) at an average temperature of the catalyst layer of 350° C. for 12 hours to activate the catalyst.

2-2. Manufacture of a Lube-Oil Base Oil by Dewaxing a Wax
2-2-1. Reaction Apparatus A lube-oil base oil was manufactured by dewaxing a wax using a fixed bed continuous circulation type reaction apparatus equipped with a reaction tube filled with the activated hydroisomerization catalyst described above. The reaction apparatus was connected to a gas chromatograph, which enabled analysis of the product at the outlet of the reactor.

2-2-2. Raw Material

As a wax raw material, a petroleum wax (the carbon number distribution: C20 to C43) was prepared.

2-2-3. Reaction Operations

The wax raw material was fed under the conditions of the reaction temperature: 200° C., the hydrogen partial pressure: 3 MPa, LHSV: 2.0 h-1, and the hydrogen/oil ratio: 500 NL/L, and the dewaxing was started by the hydroisomerization reaction. After the reaction for 72 hours, the reaction product was sampled and analyzed. Thereafter, the reaction temperature was stepwise raised up to 350° C. with the hydrogen partial pressure, LHSV and the hydrogen/oil ratio as they were, to increase the feedstock oil conversion. The operations, in which the reaction was carried out at each reaction temperature for 72 hours, and at each time when the reaction stabilized, the corresponding reaction product was sampled and analyzed, and the temperature was raised to the successive reaction temperature, were repeated.

As a result of the analysis of the reaction product of the each reaction temperature, the normal paraffin conversion in the raw material was 100% at the reaction temperature of 330° C. or more.

2-2-4. Sampling of Lube-Oil Base Oil Fractions

The product oil obtained at the reaction temperature of 330° C. was fractionated into naphtha, kerosene and gas oil fractions, and other heavy fractions (boiling point: 330° C. or more). No normal paraffin was detected in the obtained heavy fractions. The heavy fractions were further fractionated to obtain a lube-oil base oil fraction having a boiling point range of 330 to 410° C. and a kinematic viscosity at 100° C. of 2.7±0.1 cSt and a lube-oil base oil fraction having a boiling point range of 410 to 450° C. and a kinematic viscosity at 100° C. of 4.0±0.1 cSt. The yields of both the fractions were, respectively, 30% and 45% to the raw oil. The fraction having a boiling point range of 410 to 450° C. had a pour point of −27.5° C. and a viscosity index of 142.

As described heretofore, it was confirmed that by dewaxing a wax using a catalyst molded from ZSM-22[27]IE and an alumina binder and carrying platinum, a high-performance lube-oil base oil was provided with a high yield.

INDUSTRIAL APPLICABILITY

The present invention can provide a hydroisomerization catalyst having a sufficiently low cracking activity of normal paraffins and/or produced isoparaffins when the normal paraffin conversion is sufficiently raised, and having a high isomerization selectivity, in hydroisomerization of hydrocarbon oils containing normal paraffins, and a method for manufacturing the hydroisomerization catalyst. The present invention can further provide a dewaxing method of hydrocarbon oils enabling to provide, stably and with a high yield, hydrocarbon oils suitable for lube-oil base oils and/or fuel base oils from hydrocarbon oils containing normal paraffins, and a manufacturing method of lube-oil base oils enabling to provide, with a high yield, high-performance lube-oil base oils from hydrocarbon oils containing normal paraffins, by using the hydroisomerization catalyst.

The invention claimed is:

1. A hydroisomerization catalyst, obtained by calcining a catalyst composition comprising a calcined and ion-exchanged molecular sieve and at least one metal selected from the group consisting of metals of Groups 8 to 10 in the Periodic Table of the elements, molybdenum, and tungsten, carried on the calcined and ion-exchanged molecular sieve, wherein the calcined and ion-exchanged molecular sieve is obtained by ion-exchanging a molecular sieve comprising an organic template in a solution containing water as a main solvent and a cationic species to remove a part of the organic template and calcining the molecular sieve comprising an organic template to remove another part of the organic template, and the molecular sieve comprising an organic template has a nanocrystal having a pore structure of ten-membered rings or eight-membered rings and has a ratio of the pore volume to the external surface area ([pore volume]/[external surface area]) of $2.0 \times 10^4$ mL/m$^2$ to $8.0 \times 10^{-4}$ mL/m$^2$.

2. The hydroisomerization catalyst according to claim 1, wherein the molecular sieve comprising an organic template is ZSM-22, ZSM-23, or ZSM-48 type zeolite.

3. The hydroisomerization catalyst according to claim 1, wherein the calcined and ion-exchanged molecular sieve is obtained by ion-exchanging the molecular sieve comprising an organic template in the presence of ammonium ions or protons.

4. The hydroisomerization catalyst according to claim 1, wherein the calcined and ion-exchanged molecular sieve is obtained by ion-exchanging the molecular sieve comprising an organic template by replacing the solution with a new one once or more.

5. The hydroisomerization catalyst according to claim 1, wherein the catalyst composition comprises platinum and/or palladium carried on the calcined and ionexchanged molecular sieve.

6. The hydroisomerization catalyst according to claim 1, obtained by calcining the catalyst composition in an atmosphere containing molecular oxygen, and thereafter, reducing the calcined composition in an atmosphere containing molecular hydrogen.

7. The hydroisomerization catalyst according to claim 1, wherein the catalyst composition comprises 1 part by mass to 90 parts by mass of the calcined and ionexchanged molecular sieve and 99 parts by mass to 10 parts by mass of at least one porous oxide selected from the group consisting of alumina, silica, titania, boria, magnesia and zirconia.

8. The hydroisomerization catalyst according to claim 1, wherein the catalyst composition comprises:
   a carrier obtained by calcining a carrier composition comprising 1 part by mass to 90 parts by mass of the calcined and ion-exchanged molecular sieve and 99 parts by mass to 10 parts by mass of at least one porous oxide selected from the group consisting of alumina, silica, titania, boria, magnesia and zirconia; and
   the metal carried on the carrier.

9. A hydroisomerization catalyst, obtained by calcining a catalyst composition comprising a calcined and ion-exchanged molecular sieve and at least one metal selected from the group consisting of metals of Groups 8 to 10 in the Periodic Table of the elements, molybdenum, and tungsten, carried on the calcined and ion-exchanged molecular sieve, wherein
   the calcined and ion-exchanged molecular sieve, is obtained by ion-exchanging a molecular sieve comprising an organic template in a solution containing water as a main component and a cationic species and calcining the molecular sieve comprising an organic template, and
   the molecular sieve comprising an organic template has a nanocrystal having a pore structure of ten-membered rings or eight-membered rings and has a ratio of the pore volume to the external surface area ([pore volume]/[external surface area]) of $2.0 \times 10^{-4}$ mL/m$^2$ to $8.0 \times 10^-$mL/m$^2$.

10. A method for dewaxing a hydrocarbon oil, comprising bringing the hydrocarbon oil containing normal paraffins having 10 or more carbon atoms into contact with the hydroisomerization catalyst according to claim 1 in the presence of hydrogen to convert a part of or the whole of the normal paraffins into isoparaffins.

11. the method for dewaxing a hydrocarbon oil according to claim 10, wherein the hydrocarbon oil is at least one selected from the group consisting of slack wax, deoiled wax, paraffin wax, microcrystalline wax, petrolatum, and wax from Fischer-Tropsch synthesis.

12. A method for manufacturing a lube-oil base oil, comprising a step of bringing a hydrocarbon oil containing normal paraffins having 10 or more carbon atoms into contact with the hydroisomerization catalyst according to claim 1, in the presence of hydrogen under the condition of a conversion of the normal paraffins of substantially 100% by mass, the conversion being defined by the formula (I) described below:

Conversion of normal paraffins (%) =[1−(total mass % of normal paraffins having Cn or more carbon atoms contained in a hydrocarbon oil after the contact)/(total mass % of normal paraffins having Cn or more carbon atoms contained in the hydrocarbon oil before the contact)]×100     (I)

wherein Cn denotes a minimum number of carbon atoms of normal paraffins having 10 or more carbon atoms contained in the hydrocarbon oil before the contact.

* * * * *

UNITED STATES PATENT AND TRADEMARK OFFICE
CERTIFICATE OF CORRECTION

PATENT NO. : 9,518,232 B2
APPLICATION NO. : 12/865921
DATED : December 13, 2016
INVENTOR(S) : K. Hayasaka It is certified that error appears in the above-identified patent and that said Letters Patent is hereby corrected as shown below:

In the Claims

Column 24, Line 57 (Claim 1, Line 4) "8to 10in" to -- 8 to 10 in --
Column 25, Lines 4, 5 (Claim 1, Lines 18, 19) "volume][external" to -- volume]/[external --
Column 25, Line 5 (Claim 1, Line 19) "$10^4$" to -- $10^{-4}$ --
Column 25, Line 22 (Claim 5, Line 3) "ionexchanged" to -- ion-exchanged --
Column 25, Line 31 (Claim 7, Line 3) "ionexchanged" to -- ion-exchanged --
Column 26, Line 16 (Claim 9, Line 19) "$8.0 \times 10$-" to -- $8.0 \times 10^{-4}$ --
Column 26, Line 23 (Claim 11, Line 1) "the method" to -- The method --

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*